Oct. 2, 1934.  H. P. TYCHSEN  1,975,238
ARTICLE FEEDING MECHANISM
Filed Jan. 7, 1933   6 Sheets-Sheet 5

INVENTOR
Henry P. Tychsen
BY
Knight Bro
ATTORNEYS

Patented Oct. 2, 1934

1,975,238

UNITED STATES PATENT OFFICE 1,975,238

ARTICLE FEEDING MECHANISM

Henry Phillip Tychsen, New York, N. Y., assignor to Poloris Company, Inc., New York, N. Y., a corporation of New York Application January 7, 1933, Serial No. 650,611

10 Claims. (Cl. 226—14)

This invention relates more especially to article-feeding mechanisms of the type shown in U. S. Patent No. 1,605,560 for Poultice manufacturing machines which was granted in the name of R. H. Plass under date of November 2, 1926, and has for its primary object to provide an improved construction and arrangement of parts in article-feeding mechanisms of this character and an improved arrangement and sequence of conveyors for presenting articles to successively arranged mechanisms in such a way as to simplify and facilitate the performance of certain operations on the articles as well as the functioning of the machine during successive stages of manufacture.

One of the objects of my invention is to provide mechanism of improved construction for feeding articles of relatively small size through successive stages of manufacture and for grouping the completed articles in readiness for packaging and shipment.

More especially, one object of my invention is to provide mechanisms of improved construction and an improved arrangement of said mechanisms for conveying poultice sections through a poultice making machine and for packaging successive groups of the poultices in suitable containers for distribution to consumers.

More specific objects of my invention will appear in the specification, the elements of construction relating thereto being recited in the claims.

In the preferred embodiment of my invention shown on the drawings,

Figure 3 is a similar enlarged vertical longitudinal section of the left-hand portion of Figure 1, parts being broken away and parts shown in elevation.

Figure 1:
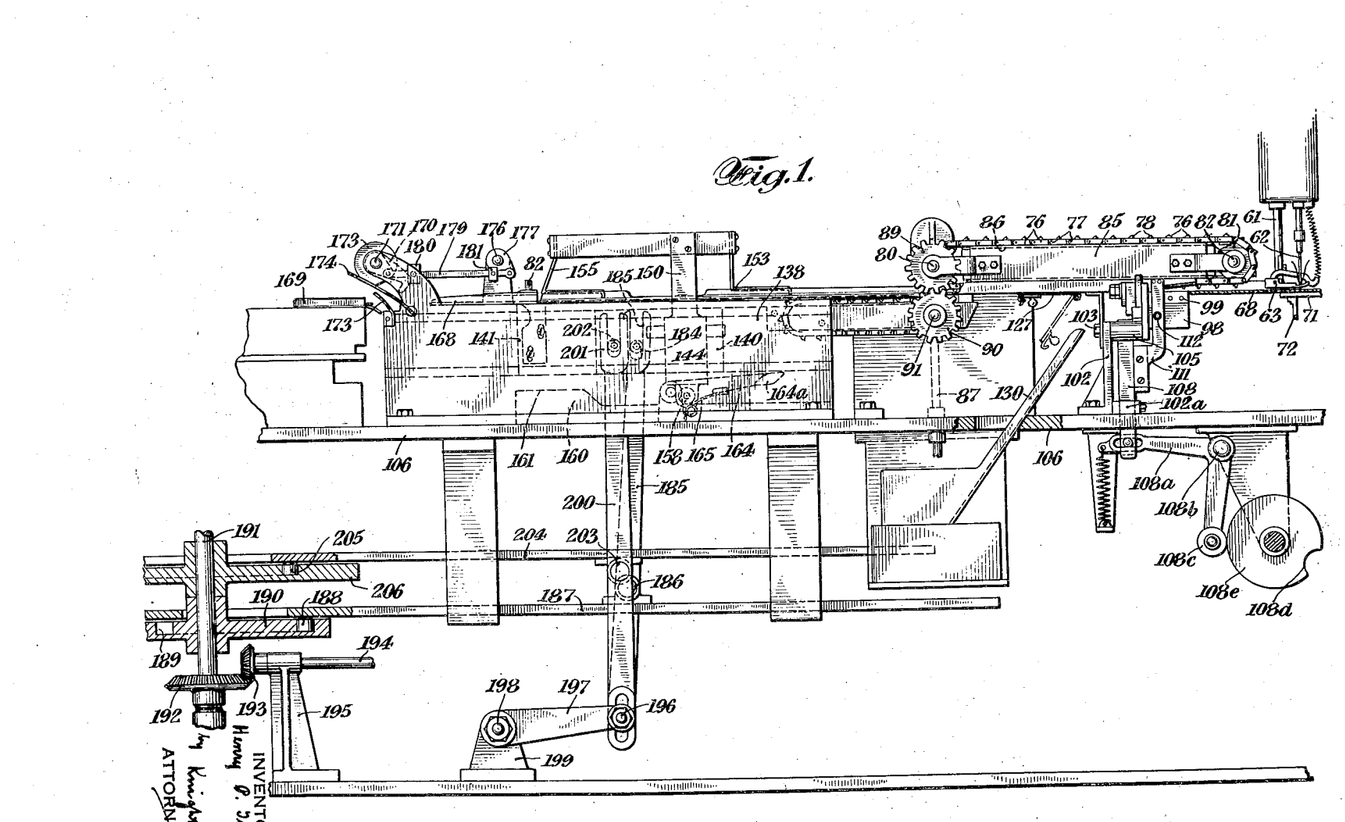
Figure 1 is a side elevation of a poultice making machine embodying my improved article feeding mechanism, parts being broken away and portions shown in section.

As shown in Figures 1 and 3 of the drawings, an overhead endless conveyor, to be presently described, operates above the plane of feed of a continuing series of poultices which move forwardly from the stitching mechanism of a poultice making machine. Said stitching mechanism is represented on the drawings by a presser foot beam 61 arranged in a vertical plane centrally with respect to laterally spaced needles 62 and carries a presser foot 63 and an auxiliary presser foot 66 which is displaceable upwardly against the pressure of a compression spring 67 and away from a plate 68 over which the poultice sections slide. A lower feed dog 71 is provided with a depending flange 72 whereby it is operated to and fro along the path of the poultices and carries toothed bars 73 for advancing said poultices over the feed plate.

Figure 2:
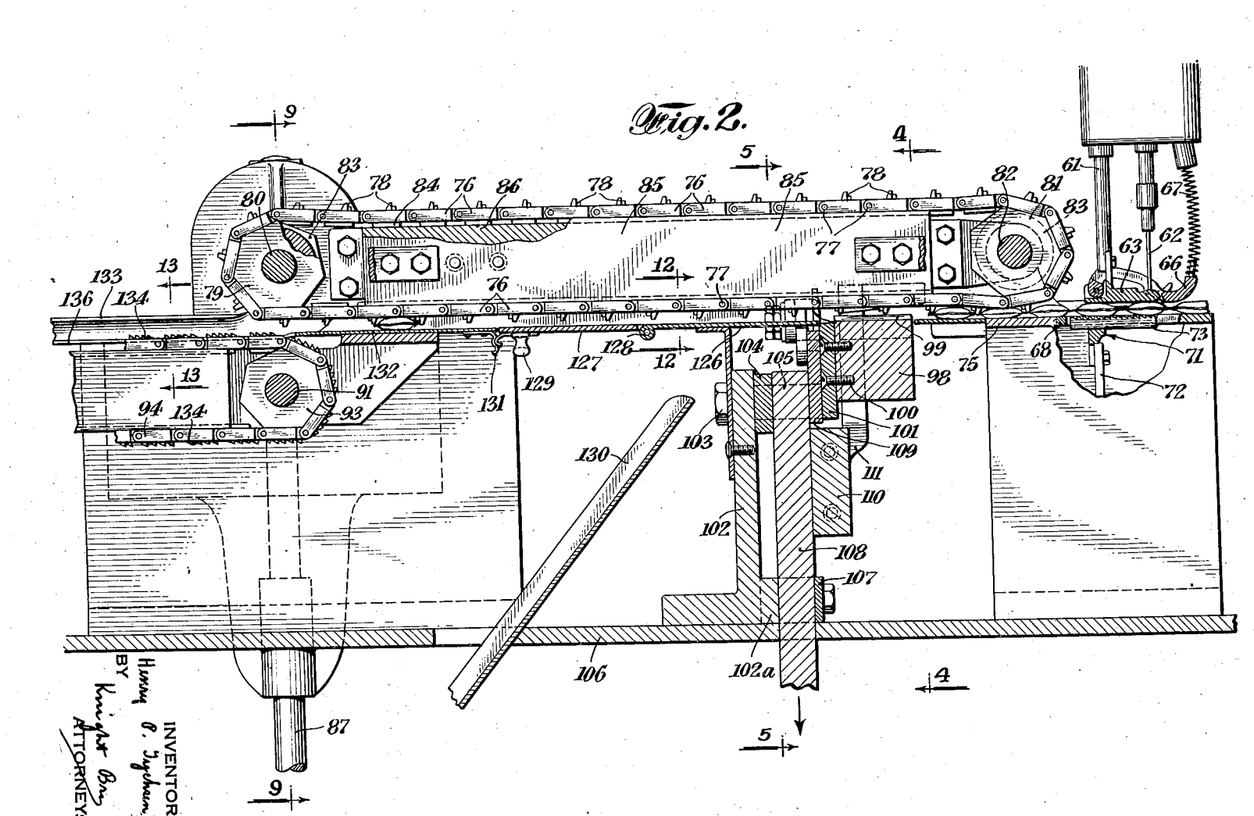
Figure 2 is an enlarged vertical longitudinal section of the right-hand portion of Figure 1, parts being broken away and parts shown in elevation.
Figures 4, 5, 6, 7, 8:
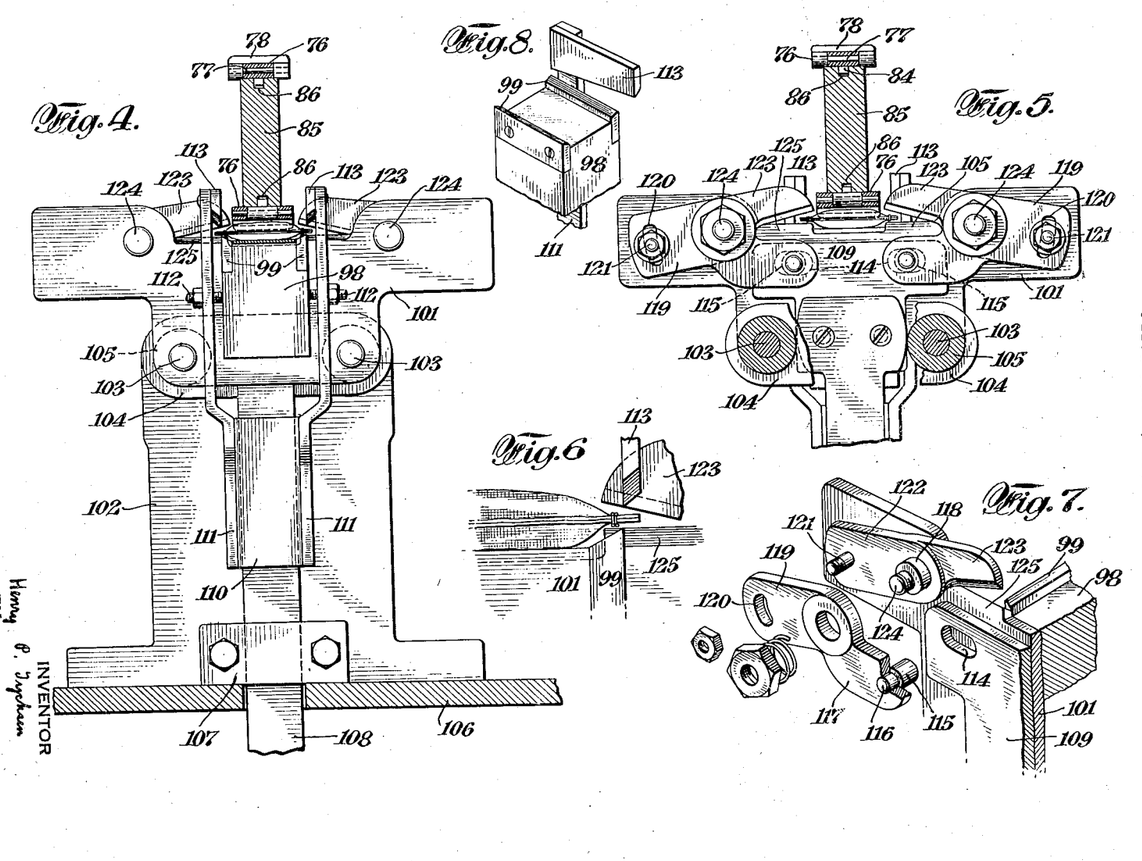
Figure 4 is an enlarged transverse section corresponding to the line 4—4 of Figure 2, showing the arrangement and functioning of the first or overhead conveyor with respect to the poultice separating and trimming mechanism of a poultice making machine.
Figure 5 is an enlarged transverse section corresponding to the line 5—5 of Figure 2, parts being broken away and parts shown in elevation.
Figure 6 is an enlarged fragmentary detail of the poultice separating and trimming device.
Figure 7 is an enlarged perspective view of the poultice parting cutters on one side, parts being broken away, parts shown in section, and parts disassembled.
Figure 8 is a perspective view of the trimmer block and one of the movable trimmer blades detached.
Figure 9:
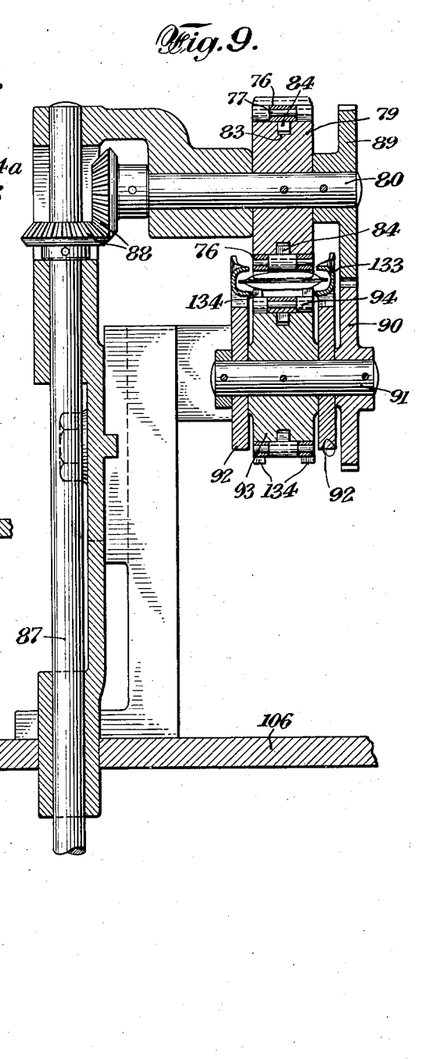
Figure 9 is an enlarged transverse section through the overlapping ends of the upper and lower endless conveyor belts, said section being taken on the line 9—9 of Figure 2.
Figures 11, 12, 13, 14, 15, 17, 19:
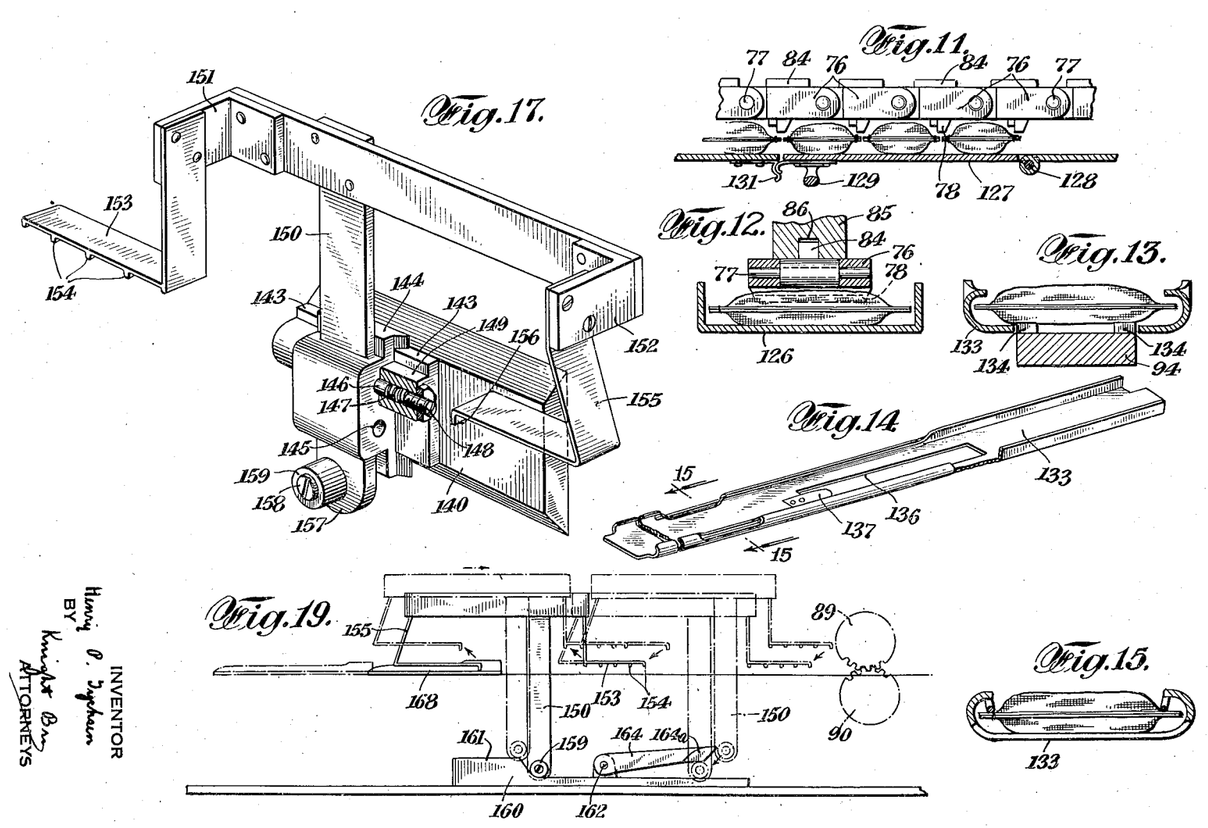
Figure 11 is an enlarged fragmentary side elevation of a portion of the lower run of the upper endless conveyor belt, contiguous portions of the elongated poultice supporting table being shown in section.
Figure 12 is an enlarged fragmentary transverse section on the line 12—12 of Figure 2.
Figure 13 is an enlarged fragmentary section on the line 13—13 of Figure 2.
Figure 14 is a perspective view of a portion of the elongated table and guide trough detached, parts being broken away and parts shown in section.
Figure 15 is a transverse section corresponding to the line 15—15 of Figure 14, with a poultice in position.
Figure 17 is a perspective view of the reciprocatory poultice delivery mechanism detached, one of the detent lugs being shown in section to expose the yieldable detent therein.
Figure 19 is a diagram showing the cycle of operations of the poultice delivery mechanism.

As each poultice section is passed through the stitching mechanism by successive impulses of the under feed dog 71, its forward movement is constrained by auxiliary presser foot 66. Each poultice section leaving the stitching mechanism becomes the last one of a series of poultices which are connected together in a chain extending forwardly from the stitching mechanism toward a poultice separating and trimming device toward which they are propelled over a plate or table 75 by means of an endless conveyor chain. As shown in Figures 2, 8, and 11, said endless conveyor may be constructed of links 76 connected by pintles 77 and provided with outwardly presented lugs 78 adapted to separately engage the respective poultices. As shown best in Figure 2 of the drawings, the endless conveyor is mounted to travel over a driving polygonal sprocket 79 keyed to a sprocket shaft 80 and a follower sprocket 81 on a shaft 82, each of said sprockets being provided with a perimetral groove 83 for the accommodation of elongated guide lugs 84 which are presented inwardly from the links 76. Extending between the sprockets 79 and 81 is a guide block 85 provided in opposite longitudinal edges thereof with guide slots or grooves 86 within which the guide lugs 84 on the links 76 slide. Referring now to Figure 9, the shaft 80 for drive sprocket 79 may receive power from a vertical shaft 87 through a pair of intermeshing bevel pinions 88. Keyed to the outer end of sprocket shaft 79 is a spur gear 89 which meshes with another spur gear 90 on a short shaft 91 which is journaled in laterally spaced plates 92. Keyed to the shaft 91 between the plates 92, is a polygonal driving sprocket 93 for the lower endless belt which comprises a series of pivotally connected links 94 of the form shown best in Figures 9 and 16. Thus, each of said links is provided with laterally spaced series of forwardly presented teeth 134 adapted to impinge upon and to carry the completed poultices in the manner indicated in Figure 13. The forward end of the lower endless belt passes around a second polygonal sprocket 96 which, as shown at the left end of Figure 3, is keyed to a cross shaft 97. Referring more especially to Figures 2 and 4, as the closed untrimmed poultice sections leave the stitching mechanism in a chain, they are propelled successively over a cutter block 98 which, as shown in Figure 8 of the drawings, is provided with laterally spaced fixed cutter blades 99, the distance between said fixed cutter blades being equal to the desired length of the finished poultices. As shown in Figures 2, 4, and 7 of the drawings, the cutter block 98 is rigidly secured by countersunk screws 100 to one side of a transverse plate or guide 101 which is rigidly connected to the upper end of a transverse supporting plate or bracket 102 by means of cap screws 103, said guide plate 101 being spaced from the bracket plate 102 by a transverse guide bar 104 and bushings 105 through which the cap screws 103 extend. The bracket plate 102 is mounted upon a supporting plate or table 106 which, as shown in Figure 1 of the drawings, is arranged under and substantially parallel to the elongated poultice feeding table. As shown in Figure 2, the bracket plate 102 is provided with a bearing pad 102a and cap plate 107 for guiding a vertically reciprocable beam 108 to the upper end of which is secured a substantially T-shaped plate 109 for operating the stitch cutting and poultice trimming mechanism now to be described, the upper end of the beam 108 with its attached plate 109 being slidably constrained by the transverse guiding bar 104 and guide plate 101. Rigidly secured to one face of the reciprocable beam 108 is a block 110 of a cutter operating yoke with upwardly extending branches formed by straps or bars 111 which are attached to opposite edges of the block 110, said straps or bars being offset from the block as shown in Figure 2 and having their upper ends outwardly displaced therefrom as shown in Figure 4. The upper extensions of the straps or bars 111 are provided with adjustable lugs or studs 112 which slidably engage the side walls of cutter block 98 and serve to adjust the vertical planes of movement of laterally spaced cutter blades 113 so that they may be made to properly cooperate with the fixed cutter blades 99 on the cutter block as they move downwardly past the latter. As the ends of each poultice are trimmed by the cutter blades 113 and 99, the poultice is disconnected from the poultice train by the stitch cutting device now to be described. As indicated in Figures 5 and 7 of the drawings, the T-shaped plate 109 is provided with two oppositely arranged slots 114. In each of said slots a roller 115 is adapted to move, said roller being journalled upon a pin 116 carried by one arm 117 of a cutter operating lever which is journaled upon an annular lug 118 which projects laterally from and constitutes the bearing boss of a cutter bar operated thereby. The other arm 119 of this lever is provided with an arcuate lug 120 in which a pin 121 is adapted to move, said pin 121 being presented laterally from the power arm 122 of a stitch severing cutter blade 123. The bearing boss 118 for the cutter blade lever is pivotally mounted on a fixed pin 124 which projects from the guide plate 101. Said guide plate is provided with laterally spaced knife edges or cutters 125 which are cooperatively arranged with respect to cutter blades 123 respectively. It will be understood from this description that each downward movement of the reciprocatory beam 108 produces a simultaneous movement of the poultice trimming blades 113 past the fixed trimmer blades 99 and likewise a stitch severing movement of the cutter blades 123 past the fixed cutter blades 125.

As the trimmed and separated poultices are propelled from the stitch severing and poultice trimming mechanism, they pass over a short fixed section 126 of the elongated table and then over a trap door section 127 which is pivoted at 128 and provided with a finger grip 129 for pulling it downward to permit poultices to drop into a chute 130 if and when any number of poultices are required for any purpose. A spring latch 131 normally retains the trap door section in position to transmit the poultices onward to another fixed section 132 of the feed table from which they are delivered to a trough-like extension 133 of the feeding support through which they are propelled by forwardly presented teeth 134 of the lower endless belt conveyor. As may be seen in Figures 13 and 16 of the drawings, the teeth 134 are arranged in laterally spaced series on each link 94 of the lower belt and engage the poultices through a slot 136 in the bottom wall of extension 133. The construction and arrangement of teeth 134 are such that they permit the poultice sections to be moved forwardly thereover by a pusher presently to be described without interference between said pusher and the teeth of the lower conveyor. For this purpose, the trough-like section 133 is provided with a tongue 137 which is presented rearwardly from the forward end of slot 136 between the spaced series of teeth 134 (see Figures 14 and 16) so that the poultices are guided from the lower conveyor as the links 94 of said conveyor move downwardly around the sprocket 96. The construction and movement of the pusher are so related to the lower conveyor that the former at each forward movement operates to remove a group of poultices from the forward end of the latter.

Figures 5, 16, 18, 20:
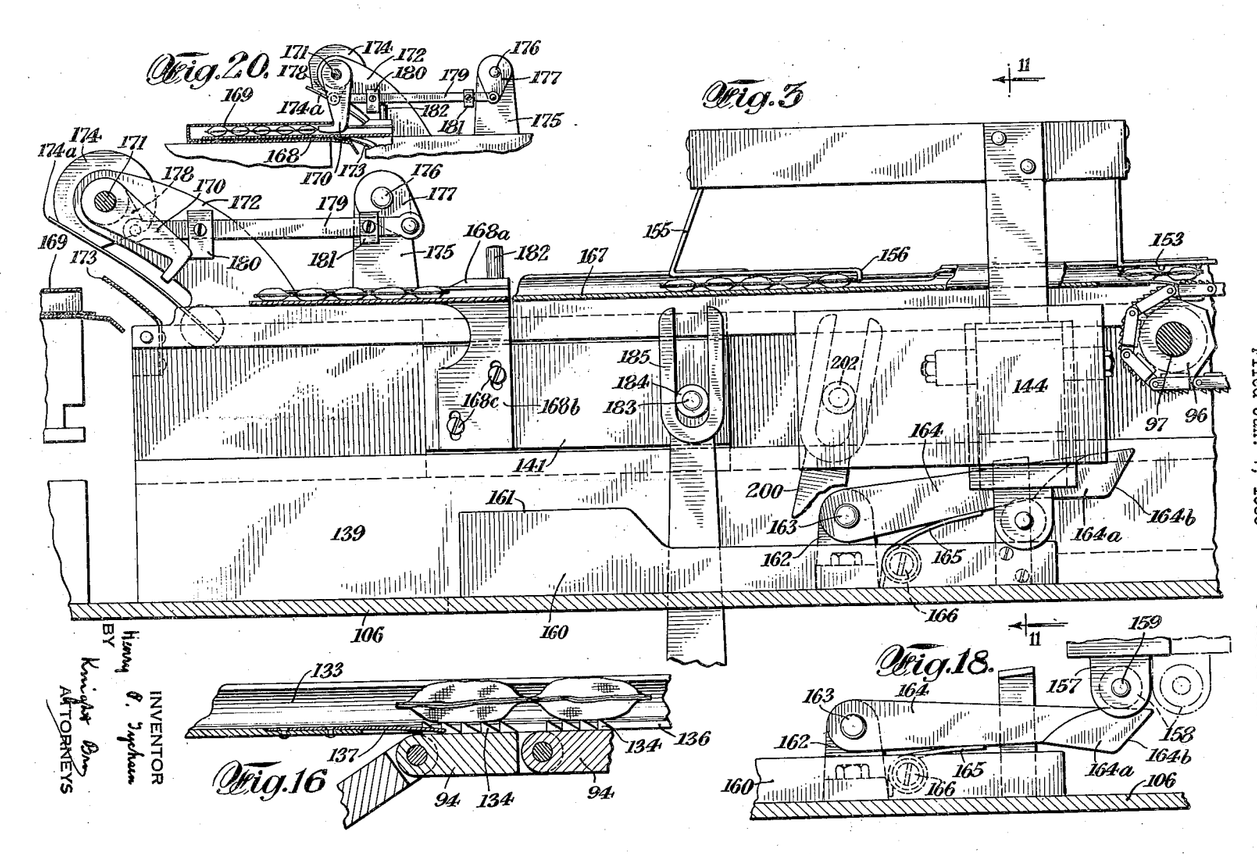
Figure 16 is an enlarged fragmentary longitudinal section of the delivery end of the lower conveyor belt with contiguous portions of the guiding trough or elongated table.
Figure 18 is an enlarged fragmentary side elevation of the operating cam mechanism connected with the poultice delivery mechanism.
Figure 20 is a fragmentary vertical longitudinal section on a reduced scale similar to the left end of Figure 3 showing the parts in their relative positions at the instant the completed poultices are being charged into a carton.
Figure 10:
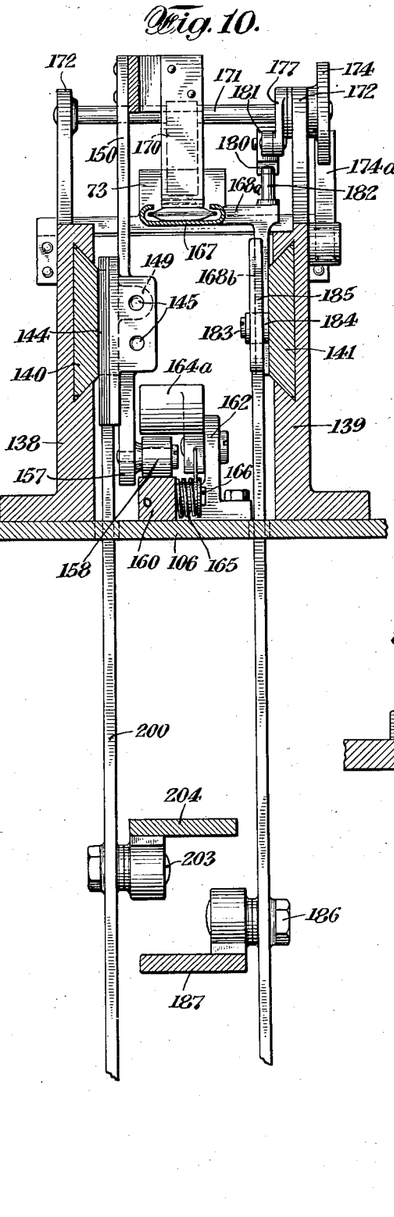
Figure 10 is an enlarged transverse section taken on the line 10—10 of Figure 3.

Referring to Figures 1 and 10 of the drawings, mounted on the under plate or table 106 are laterally spaced guide plates or supporting frames 138 and 139 provided with inwardly presented dovetailed guides within which are reciprocably mounted slides 140 and 141. As shown best in Figure 17, the slide 140 carries on its inner face longitudinally spaced guide bars 143 between which is reciprocably mounted a vertical slide 144. In each lateral edge of the slide 144 are provided upper and lower sockets or depressions 145 into which a pin or detent 146 is adapted to engage under the pressure of a compression spring 147 interposed between it and the inner end of a grub screw 148, each of the spring detents being mounted within a protuberance 149 on the guide 143. It will be understood from this description that the slide 144 is yieldably held in upper or lower position to which it has been displaced in the manner to be explained. Projecting upwardly from the slide 144 is a standard 150 which is provided with a rearwardly presented elbow 151 and a forwardly presented elbow 152. Depending from the elbow 151 is an angular strap or pusher arm 153 which is provided below with lugs 154, said lugs being adapted to engage a series of poultices as they move forwardly on the forward end of the lower conveyor 135. The elbow 152 carries an angular pusher arm 155 with a depending flange 156 which is adapted to displace a group of poultices forwardly for charging them into a packaging container to be hereinafter referred to. Depending from the slide 144 is a cam roller support 157 with a laterally projecting stud 158 upon which is journaled a cam roller 159. As shown in Figure 10 of the drawings, a cam bar 160 is mounted on the plate or table 106 between the side frames 138 and 139 in suitable position to engage the cam roller 159 during the forward movement of the slide 140. As shown in Figure 3, the cam bar 160 is provided with an upper run 161 to which the cam roller 158 is elevated on its forward movement with the result that the slide 144 is elevated to its raised position preparatory to the return movement of the pusher. Mounted adjacent to the cam bar 160 as shown in Figures 3 and 10, is a bracket 162 which carries a pivot 163 for a movable cam bar 164, said cam bar being yieldably retained in raised position by a spring 165 coiled about a stud 166. As shown best in Figure 10, the cam bar 164 has an outer end portion 164a which overhangs the cam roller 158 so that when the slide 140 moves rearwardly, the cam roller 158 travels over the upper edge of cam bar 164 until, as shown in dotted lines in Figure 18, it passes over the end of said bar and thus releases the cam bar 164 to return to its upper position so that during the following forward movement of the slide 140, the cam roller 158 engages the inclined surface 164b and is thus moved downwardly to return the slide 144 to its lower position in readiness for the next forward stroke of slide 140. As the slide 140 moves forwardly from its position shown in Figure 3, it will be seen that one group of poultices is being conveyed forwardly from the lower endless belt conveyor, while at the same time a previously removed group of poultices is being moved forwardly over the trough-like section 167 of the elongated table to a reciprocatory tray 168 which is moved to and fro from its rear position in which it receives the poultices from the pusher to its forward position in which the poultices are delivered within a box or container 169 as shown in Figure 20. As shown in Figures 3 and 10, the tray 168 is carried by an inwardly presented bracket arm 168a at the upper end of a supporting plate 168b which is secured to the inner face of slide 141 by means of screws 168c. As the tray 168 is moved forwardly by the slide 141, its forward end comes into engagement with a spring plate 173 and depresses it downwardly into a position in which it provides a smooth surface for the entrance of the tray 168 into the container 169. As the tray reaches its extreme position as shown in Figure 20 of the drawings, a poultice holding arm 170 is thrown into position to retain the poultice within the carton upon the withdrawal of the tray. Said arm is carried by a rock shaft 171 which oscillates in two curved bracket arms 172 which project from the upper edges of side frames 138 and 139. Keyed to one outer end of the rock shaft 171 is a detent disk 174 provided with two flat surfaces adapted to be engaged in alternation by a leaf spring 174a for retaining the holding arm 170 in one or the other of its positions shown in Figures 3 and 20. Projecting upwardly from the upper edge of side frame 139 is a second bracket arm 175 which carries a pin 176 upon which a radial arm 177 is pivoted. Connecting the free end of arm 177 to the outer end of an operating arm 178 on the rock shaft 171, is a connection rod 179 which carries a front tappet block 180 and a rear tappet block 181. From an inspection of Figure 3 of the drawings it may be seen that a pin or projection 182 which is presented upwardly from the upper edge of the tray supporting plate 168b is arranged to strike the front tappet block 180 near the end of its forward stroke and thus operates to throw the poultice intercepting arm into position to retain said poultices in the carton as shown in Figure 20. At the same time, the connection rod 179 has been lowered sufficiently to bring the rear tappet block 181 into the return path of the pin or projection 182 so that the return movement of the tray 168 is accompanied by a return of the several parts to their relative positions shown in Figure 3. Projecting inwardly from the slide 141 is a stud 183 upon which is journalled a roller 184, said roller being arranged to operate in the slotted upper end 185 of a floating lever of the third class which is pivotally connected at 186 to a flat cam bar 187. Journalled upon the cam bar 187 is a cam roller 188 which operates in the cam groove 189 of a cam plate 190 keyed to a vertical cam shaft 191, said cam shaft carrying a bevelled gear 192 driven by a bevelled pinion 193 on a power shaft 194 which is journalled in a bracket 195. The slotted lower end of the floating lever slidably engages a pin 196 in the outer end of an arm 197 which is pivoted at 198 in a block support 199. Similar mechanism for driving the reciprocatory pusher slide 140, comprises another floating lever 200 of the third class provided with a slotted upper end 201 which operates on a cam roller 202 journalled on the inner face of pusher slide 140 and is pivotally connected at 203 to a flat cam bar 204 having a cam roller 205 which adapts the cam bar to be actuated by a second grooved cam plate 206 keyed to the vertical cam shaft 191. The lower slotted end of the floating lever 200 is also slidable on the pin 196. As shown in Figure 1 of the drawings, the reciprocatory beam 108 which operates the stitch severing and poultice trimming mechanism may be driven by a bell crank lever 108a pivoted at 108b, said bell crank lever carrying a cam roller 108c adapted to fall into a peripheral notch 108d in a cam disk 108e at suitable periodic intervals.

I claim:—

1. In a machine of the character described, the combination with an article-guiding support, of an article-carrying tray reciprocable in a fixed plane towards one end of said article-guiding support for receiving articles therefrom and away from said article-guiding support for conveying said articles to a carton, a pusher movable back and forth along said guiding support for transferring articles therefrom to said article-carrying tray, and means for moving said pusher to a plane of movement adjacent to said article-guiding support for its approach towards the article-carrying tray and to a plane of movement more remote for its movement away from said tray.

2. In a machine of the character described, the combination with an article-guiding support, of an article-carrying tray reciprocable in the fixed plane of said article-guiding support and towards and away from one end thereof, a pusher movable back and forth along said guiding support for propelling articles therefrom to said article-carrying tray, means for lowering said pusher to a plane of movement adjacent to said article-guiding support for its movement towards the article-carrying tray and for raising it to a higher plane of movement during its movement away from said tray, and means for moving articles along said article-guiding support into the path of said pusher on its movement towards said tray.

3. In a machine of the character described, the combination with an article-guiding support, of an article-carrying tray reciprocable in the plane of said article-guiding support into and out of position to constitute substantially an extension of said guiding support for slidably discharging groups of articles from said guiding support to said article-carrying tray, a pusher movable forwardly along said article-guiding support as said article-carrying tray moves rearwardly into said position, and means for feeding a predetermined number of said articles along said article-guiding support into the path of said pusher on each of its forward movements for their discharge in a group to said tray.

4. In a machine of the character claimed in claim 3, in which said feeding means consists of an endless belt conveyor comprising links constructed and arranged to separately engage the respective articles for moving them along said article-guiding support in timed relation to the reciprocatory movements of said pusher, and in which said pusher comprises a rear branch constructed and arranged to separately engage a predetermined number of said articles while they are being propelled along said article-guiding support by said endless conveyor and a forward branch constructed and arranged to convey said articles in close formation in a group from the position in which they were left by said rear branch to said tray.

5. In article feeding mechanism, the combination with an elongated guide, of means operating from below said elongated guide for propelling poultices in spaced order therealong, a poultice-charging tray reciprocable in the plane of said elongated guide into and out of a position in which it constitutes substantially an extension of the delivery end of said elongated guide, and a two-stage poultice pusher reciprocable longitudinally of said elongated guide and operable upon said poultices from above said elongated guide, said poultice pusher comprising a portion constructed and arranged to separately engage a plurality of said poultices while they are being propelled forwardly by said poultice-propelling means for moving them in spaced order along said elongated guide to positions beyond the travel of said poultice-propelling means, and another portion constructed and arranged to move said poultices into close order for delivering in a group to said poultice-charging tray.

6. Article feeding mechanism of the character claimed in claim 5, in which said two-stage poultice pusher is provided with a slide reciprocable longitudinally of said elongated guide, a standard movable upwardly and downwardly on said slide, means yieldably retaining said standard in raised position during each retrograde movement with respect to said charging tray and in lowered position during each forward movement in respect thereto, rearwardly- and forwardly-presented poultice-engaging arms mounted on said upwardly- and downwardly-movable standard, and means for moving said standard and poultice engaging arms upwardly and downwardly at opposite extremes of their longitudinal movements.

7. Article feeding mechanism of the character claimed in claim 5, in which laterally spaced slides are arranged to reciprocate longitudinally of the elongated poultice guide and constructed to carry said poultice charging tray and said two-stage poultice pusher respectively.

8. In a poultice machine, the combination with an elongated guide, of means for propelling poultices in spaced order along said elongated guide, a poultice-charging tray reciprocable in the plane of said elongated guide into and out of a position in which it constitutes substantially an extension of the delivery end of said elongated guide, and means movable longitudinally of said elongated guide for separately engaging a plurality of said poultices in the spaced order in which they are being propelled by said poultice-propelling means along said elongated guide and for delivering said poultices in close order to said poultice-charging tray.

9. In a poultice machine, the combination with an elongated guide, of an endless conveyor arranged below said elongated guide for propelling poultices in spaced order therealong, a poultice-charging tray reciprocable in the plane of said elongated guide into and out of a position in which it constitutes substantially an extension of the delivery end of said elongated guide, and a poultice pusher operating above said elongated guide for separately engaging a plurality of said poultices while they are being propelled by said poultice-propelling means and delivering them to said poultice-charging tray.

10. In a poultice machine, the combination with an elongated guide, of means for propelling poultices in spaced order along said elongated guide, a poultice-charging tray reciprocable in the plane of said elongated guide into and out of a position in which it constitutes substantially an extension of the delivery end of said elongated guide, and a two-stage poultice pusher reciprocable longitudinally of said elongated guide and comprising a portion constructed and arranged to separately engage a plurality of said poultices while they are being propelled by said poultice-propelling means in spaced order along said elongated guide, and another portion constructed and arranged to collect said group of spaced poultices into close order for moving them from positions beyond the delivery end of said poultice-propelling means to said poultice-charging tray.

HENRY PHILLIP TYCHSEN.